(12) United States Patent
Jaskolski

(10) Patent No.: US 7,566,085 B2
(45) Date of Patent: Jul. 28, 2009

(54) TAILGATE-ATTACHED CARGO SUPPORT APPARATUS

(76) Inventor: David A. Jaskolski, W276 S8575 Lakeview La., Mukwonago, WI (US) 53149

( * ) Notice: Subject to any disclaimer, the term of this patent is extended or adjusted under 35 U.S.C. 154(b) by 0 days.

(21) Appl. No.: 12/156,731

(22) Filed: Jun. 4, 2008

(65) Prior Publication Data

US 2008/0303304 A1    Dec. 11, 2008

Related U.S. Application Data

(60) Provisional application No. 60/933,462, filed on Jun. 7, 2007.

(51) Int. Cl.
*B60N 2/00* (2006.01)
(52) U.S. Cl. ..................... 296/57.1; 296/37.6
(58) Field of Classification Search ................ 296/57.1, 296/26.11, 26.08, 37.1, 37.5, 37.6
See application file for complete search history.

(56) References Cited

U.S. PATENT DOCUMENTS

| | | | |
|---|---|---|---|
| 5,997,066 A | 12/1999 | Scott | |
| 6,116,676 A | 9/2000 | Edwards | |
| 6,343,826 B2 | 2/2002 | Bohannon | |
| 6,631,938 B1 | 10/2003 | Burns | |
| 6,695,556 B2 | 2/2004 | Addy | |
| 2002/0109369 A1* | 8/2002 | Boomhower et al. | 296/63 |
| 2002/0121794 A1* | 9/2002 | Vejnar | 296/50 |
| 2004/0026950 A1* | 2/2004 | Zagaroff | 296/57.1 |

* cited by examiner

*Primary Examiner*—Joseph D Pape

(57) ABSTRACT

A cargo support apparatus is attached to a tailgate of a vehicle and includes a platform unit suitably adapted to be connected to the bottom of the tailgate, platform-to-tailgate orientation and support members connected between the platform unit and the tailgate for orienting and supporting the platform unit with respect to the tailgate, and a platform-to-tailgate locking assembly connected to the platform unit for locking the platform unit in a raised condition with respect to the tailgate. The subject tailgate-attached cargo support apparatus is suitably adapted to be raised up and locked in position in the "up" condition when not in use and subsequently "unlocked" so as to be lowered to a horizontal orientation for receipt of cargo to be supported thereon.

11 Claims, 3 Drawing Sheets

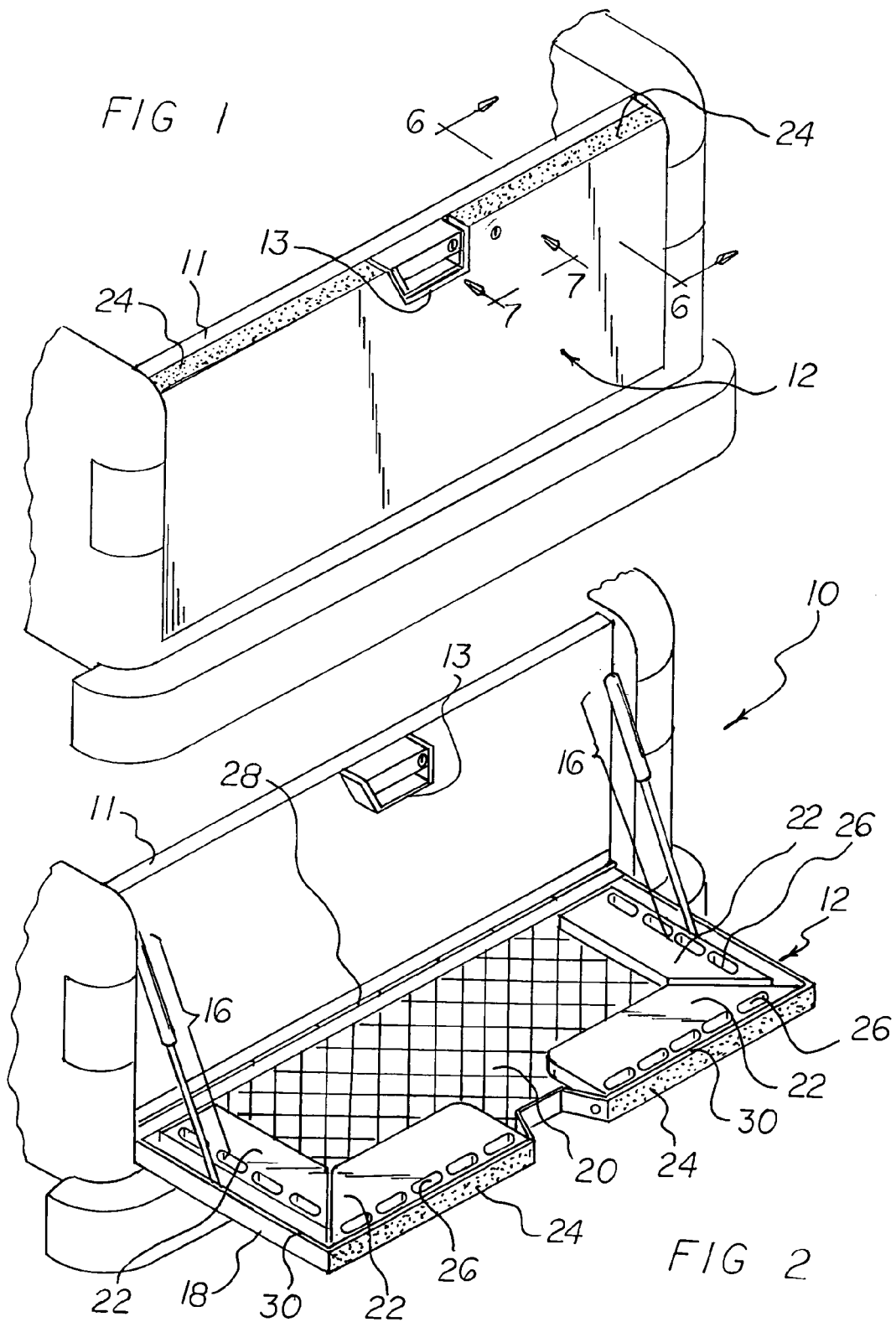

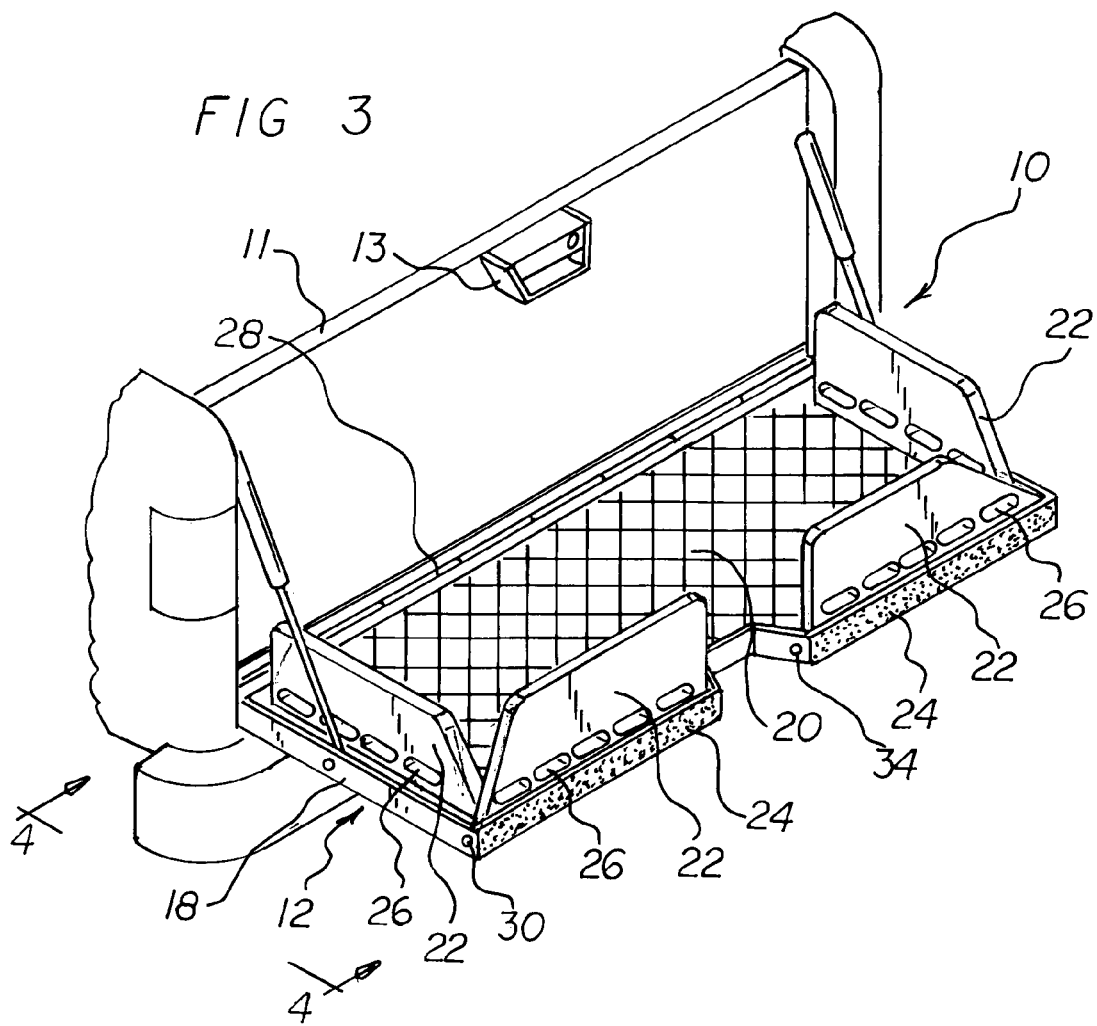
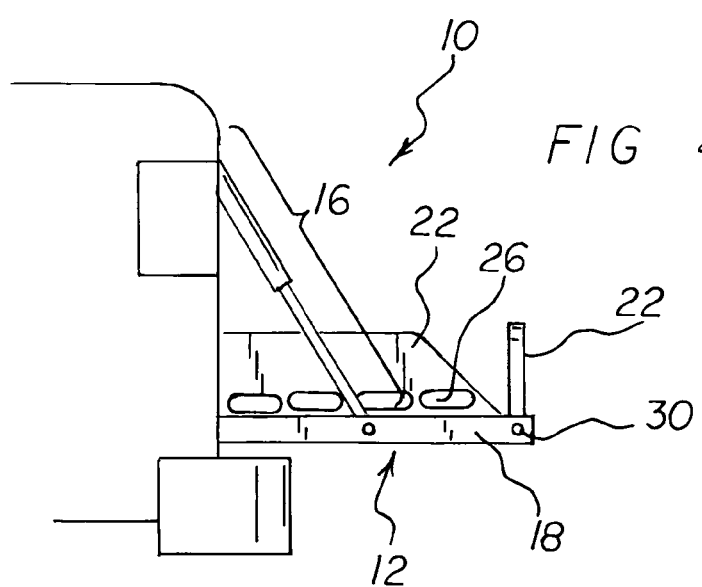

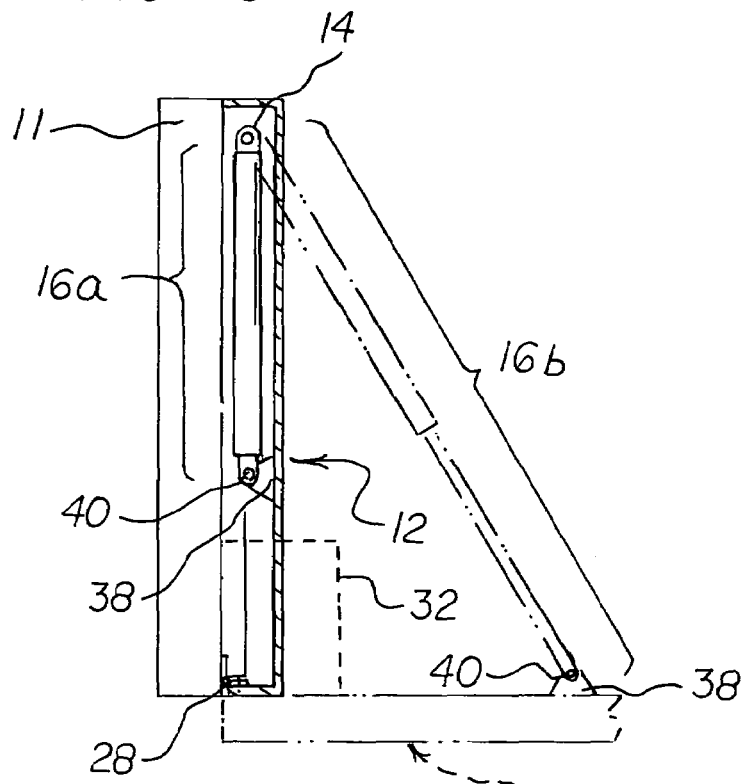
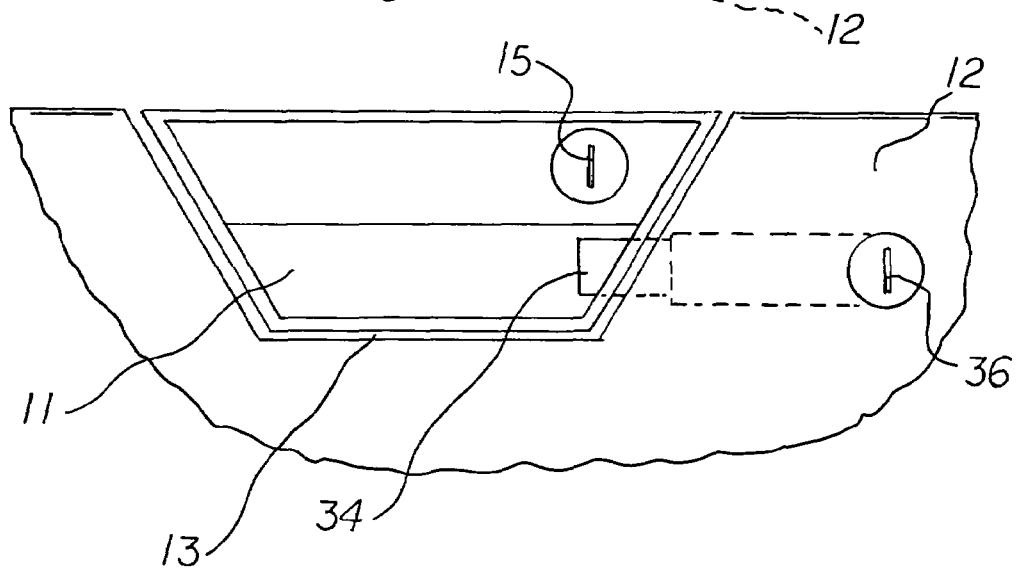

TAILGATE-ATTACHED CARGO SUPPORT APPARATUS

CROSS-REFERENCE TO RELATED APPLICATION

This application claims priority based upon my Provisional Application Ser. No. 60/933,462; filed Jun. 7, 2007.

BACKGROUND OF THE INVENTION

1. Field of the Invention

The present invention relates generally to truck bed extenders, and, more particularly, to a truck bed extender that is attached to a truck tailgate.

2. Description of the Prior Art

It is well known that truck beds, such as pickup truck beds, are often too short for all the cargo that a user desires to transport by the truck. From this problem, throughout the years, a number of innovations have been developed relating to extending truck beds to increase their cargo carrying capacity, and the following U.S. patents are representative of some of those innovations: U.S. Pat. Nos. 5,997,066, 6,116,676, 6,343,826, and 6,631,938. More specifically, U.S. Pat. No. 5,997,066 discloses a number of fence units that fit onto a lowered tailgate and form an enclosure with the tailgate as the floor of the enclosure. The fence units are separate and distinct from the tailgate. Consequently, when the fence units are no longer needed on the tailgate, the fence units must be removed from the tailgate and placed in storage. Rather than have separate fence portions separate and distinct from a tailgate, it would be desirable if a tailgate unit that included foldable fence units that can be folded into the tailgate unit for storage when the fence units are no longer needed.

U.S. Pat. No. 6,116,676 discloses a folding tailgate seat. That is, the seats are located on the lowered tailgate. When the tailgate is lowered, items on the truck bed may roll out from the truck bed, past the lowered tailgate, and onto the road. In this respect, it would be desirable if a truck bed extender were provided which permits the tailgate to remain in the raised condition when the tailgate extender is in use.

U.S. Pat. No. 6,343,826 discloses a truck bed extender which fits into side walls of a truck bed. The truck bed extender fits onto of a raised tailgate. The floor of the truck bed extender is not coplanar with the truck bed. For most cargo hauling purposes, it would be desirable if the floor of a truck bed extender were coplanar with the truck bed.

U.S. Pat. No. 6,631,938 discloses a retractable tailgate bench. The tailgate bench is hinged to the top of the tailgate. When the bench portion is deployed, the plane of the bench surface is in a position that is lower than the plane of the truck bed. Moreover, then the tailgate bench is in the lowered position, the tailgate must be in a lowered position. More specifically, the tailgate bench cannot be used when the tailgate is in the raised position. As stated above, it would be desirable if a truck bed extender were provided such that it can be used with the tailgate in a raised position and such that the truck bed extender is coplanar with the truck bed.

U.S. Pat. No. 6,695,556 may be of interest for its disclosure of a vehicle rear door tie down kit.

Still other features would be desirable in a tailgate-attached cargo support apparatus. For example, it would be desirable if a truck bed extender can be folded into and stored in a tailgate. That is, when the truck bed extender is stored in the tailgate unit, the truck bed extender is hidden from view and is integrated into the tailgate.

Another desirable feature of a tailgate-attached cargo support apparatus is the provision of means for orienting a lowered tailgate unit in an orientation that is coplanar with the truck bed.

Thus, while the foregoing body of prior art indicates it to be well known to use a truck bed extender, the prior art described above does not teach or suggest a tailgate-attached cargo support apparatus which has the following combination of desirable features: (1) provides a tailgate unit that includes foldable fence units that can be folded into the tailgate unit for storage when the fence units are no longer needed; (2) permits the tailgate to remain in the raised condition when the tailgate extender is in use; (3) provides that the floor of a truck bed extender is coplanar with the truck bed; (4) when the truck bed extender is stored in the tailgate unit, the truck bed extender is hidden from view and is integrated into the tailgate; and (5) provides means for orienting a lowered tailgate unit in an orientation that is coplanar with the truck bed. The foregoing desired characteristics are provided by the unique tailgate-attached cargo support apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a cargo support apparatus that is attached to a tailgate and that includes a platform unit, platform-to-tailgate attachment means connected between the platform unit and the tailgate for attaching the platform unit to the tailgate at the bottom of the tailgate, platform-to-tailgate orientation and support means connected between the platform unit and the tailgate for orienting and supporting the platform unit with respect to the tailgate, and platform-to-tailgate locking means connected to the platform unit for locking the platform unit in a raised condition with respect to the tailgate. The subject tailgate-attached cargo support apparatus permits the platform unit to be raised up when not in use and lowered to a horizontal orientation for receipt of cargo to be supported thereon.

Preferably, the platform unit includes a platform floor which includes a non-skid top surface.

Preferably, the platform unit includes a plurality of fence units attached to outside edge portions of the platform floor. Preferably, the fence units are hingedly attached to the platform floor by fence-to-platform hinges.

Preferably, the fence units include fence slots.

Preferably, the platform unit includes reflective material on a rear-facing end of the platform unit when the platform unit is in a horizontal orientation when deployed for carrying cargo.

The platform-to-tailgate attachment means can include a platform-to-tailgate attachment hinge that connected between one side of the platform unit and the tailgate.

The platform-to-tailgate orientation and support means include horizontal-orientation-support means for orienting the platform unit in a horizontal orientation with respect to the tailgate. The horizontal-orientation-support means can include support fasteners that are connected to the tailgate, In addition, the horizontal-orientation-support means include telescopic orientation and support means rotatably connected at a top end to the support fasteners and rotatably connected at a bottom end to a distal portion of the platform unit.

The telescopic orientation and support means have a linear extension which is approximately equal to the hypotenuse of a right triangle formed by a side of the tailgate, a side of the platform unit, and the linear extension of the telescopic orientation and support means forming the third side, wherein an approximately right angle is formed between the side of the tailgate and the side of the platform unit.

Preferably, the telescopic orientation and support means include gas operated shock absorbers rotatably connected at a top end to the support fasteners and rotatably connected at a bottom end to a distal portion of the platform unit.

Preferably, the tailgate includes a tailgate latch handle, and the platform-to-tailgate locking means include a platform-mounted, tailgate-latch-handle-engaging platform lock bolt which engages the tailgate latch handle.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tailgate-attached cargo support apparatus which has all of the advantages of the prior art and none of the disadvantages.

It is another object of the present invention to provide a new and improved tailgate-attached cargo support apparatus which may be easily and efficiently manufactured and marketed.

It is a further object of the present invention to provide a new and improved tailgate-attached cargo support apparatus which is of durable and reliable construction.

An even further object of the present invention is to provide a new and improved tailgate-attached cargo support apparatus which is susceptible of a low cost of manufacture with regard to both materials and labor, and which accordingly is then susceptible of low prices of sale to the consuming public, thereby making such tailgate-attached cargo support apparatus available to the buying public.

Still yet a further object of the present invention is to provide a new and improved tailgate-attached cargo support apparatus which provides a tailgate unit that includes foldable fence units that can be folded into the tailgate unit for storage when the fence units are no longer needed.

Still another object of the present invention is to provide a new and improved tailgate-attached cargo support apparatus that permits the tailgate to remain in the raised condition when the tailgate extender is in use.

Yet another object of the present invention is to provide a new and improved tailgate-attached cargo support apparatus which provides that the floor of a truck bed extender is coplanar with the truck bed.

Even another object of the present invention is to provide a new and improved tailgate-attached cargo support apparatus such that when the truck bed extender is stored in the tailgate unit, the truck bed extender is hidden from view and is integrated into the tailgate.

Still a further object of the present invention is to provide a new and improved tailgate-attached cargo support apparatus which includes means for orienting a lowered tailgate unit in an orientation that is coplanar with the truck bed.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a rear perspective view showing a preferred embodiment of the tailgate-attached cargo support apparatus of the invention in a raised up condition.

FIG. 2 is a rear perspective view showing the embodiment of the tailgate-attached cargo support apparatus of the invention in FIG. 1 in a lowered condition with the fences not deployed.

FIG. 3 is a rear perspective view showing the embodiment of the tailgate-attached cargo support apparatus of the invention in FIG. 2 in a lowered condition with the fences deployed.

FIG. 4 is a side view of the embodiment of the invention shown in FIG. 3, taken along line 4-4 of FIG. 3.

FIG. 5 is an enlarged partial cross-sectional view of the apparatus in a raised condition is solid lines and in a lowered condition in broken lines.

FIG. 6 is an enlarged rear view portion of a locking portion of the apparatus in interengagement with a locking portion of a tailgate.

DESCRIPTION OF THE PREFERRED EMBODIMENT

With reference to the drawings, a new and improved tailgate-attached cargo support apparatus embodying the principles and concepts of the present invention will be described.

Turning to FIGS. 1-6, there is shown a preferred embodiment of the tailgate-attached cargo support apparatus of the invention generally designated by reference numeral 10. In each of the figures, reference numerals are shown that correspond to like reference numerals that designate like elements shown in other figures.

In the preferred embodiment, a cargo support apparatus 10 is attached to a tailgate 11 and includes a platform unit 12, platform-to-tailgate attachment means connected between the platform unit 12 and the tailgate 11 for attaching the platform unit 12 to the tailgate 11, platform-to-tailgate orientation and support means connected between the platform unit 12 and the tailgate 11 for orienting and supporting the platform unit 12 with respect to the tailgate 11, and platform-to-tailgate locking means connected to the platform unit 12 for locking the platform unit 12 in a raised condition with respect to the tailgate 11. The subject tailgate-attached cargo support apparatus 10 permits the platform unit 12 to be raised up when not in use and lowered to a horizontal orientation for receipt of cargo to be supported thereon.

Preferably, the platform unit 12 includes a platform floor 18 which includes a non-skid top surface 20. The non-skid top surface 20 of the platform floor 18 portion can include a plastic liner and/or a sprayed on surface coating.

Preferably, the platform unit 12 includes a plurality of fence units 22 attached to outside edge portions of the platform floor 18. Preferably, the fence units 22 are hingedly attached to the platform floor 18 by fence-to-platform hinges 30.

Preferably, the fence units 22 include fence slots 26. The fence slots 26 are used for receiving straps for tying down cargo onto the platform unit 12.

Preferably, the platform unit 12 includes reflective material 24 on a rear-facing end of the platform unit 12 when the platform unit 12 is in a horizontal orientation when deployed for carrying cargo.

The platform-to-tailgate attachment means can include a platform-to-tailgate attachment hinge 28 that is connected between one side of the platform unit 12 and the tailgate 11. The platform-to-tailgate orientation and support means can include horizontal-orientation-support means for orienting the platform unit 12 in a horizontal orientation with respect to the tailgate 11. The horizontal-orientation-support means can include support fasteners 14 that are connected to the tailgate 11. In addition, the horizontal-orientation-support means can include telescopic orientation and support means rotatably connected at a top end to the support fasteners 14 and rotatably connected at a bottom end to a distal portion of the platform unit 12.

The support fasteners 14 can be support bolts 14 that are partially screwed into the tailgate 11, allowing for ends of the telescopic orientation and support means to be supported by and rotate around the support bolts 14

The telescopic orientation and support means have a linear extension which is approximately equal to the hypotenuse of a right triangle formed by a side of the tailgate 11, a side of the platform unit 12, and the linear extension of the telescopic orientation and support means forming the third side, wherein an approximately right angle 32 is formed between the side of the tailgate 11 and the side of the platform unit 12.

Preferably, the telescopic orientation and support means include gas operated shock absorbers 16 rotatably connected at a top end to the support fasteners 14 and rotatably connected at a bottom end to a distal portion of the platform unit 12. More specifically, the bottom end of each gas operated shock absorber 16 can be connected to the platform unit 12 by means of a shock absorber attachment bracket 38 which is connected to the platform unit 12 and by a shock absorber pivot pin 40 interconnected between the shock absorber attachment bracket 38 and the gas operated shock absorber 16. The gas operated shock absorbers 16 not only serve to maintain the platform unit 12 in a horizontal orientation, they also serve to prevent the platform unit 12, with cargo thereon, from slamming or bouncing up and down during travel of the vehicle.

Alternatively, the telescopic orientation and support means can includes telescopic swing arms (not shown).

Preferably, the tailgate 11 includes a tailgate latch handle 13, and the platform-to-tailgate locking means include a platform-mounted, tailgate-latch-handle-engaging platform lock bolt 34 which engages the tailgate latch handle 13. The tailgate latch handle 13 is controlled by a key-operated tailgate lock which has a tailgate-lock-key-reception slot 15, and the tailgate-latch-handle-engaging platform lock bolt 34 is controlled by a key-controlled platform lock which has a platform-lock-key-reception slot 36.

Before using the tailgate-attached cargo support apparatus 10 of the invention, the apparatus 10 is in a raised and locked position with respect to the tailgate 11, as shown in FIG. 1 and in the solid-lined portion of FIG. 5. In this respect, the tailgate-latch-handle-engaging platform lock bolt 34 is in engagement with the tailgate latch handle 13 as shown in greatest detail in FIG. 6.

To lower the tailgate-attached cargo support apparatus 10 so that the platform unit 12 is in a horizontal orientation, a proper key (not shown) is inserted into the platform-lock-key-reception slot 36, and the tailgate-latch-handle-engaging platform lock bolt 34 is disengaged from the tailgate latch handle 13. As a result, the platform unit 12 can rotate downward around the platform-to-tailgate attachment hinge 28 so that the platform floor 18 rests in a horizontal orientation, as shown in FIGS. 2, 3, and 4, and in the broken-line portion of FIG. 5.

During movement of the platform unit 12 from the raised vertical orientation shown in FIG. 1 to the lowered horizontal orientation shown in FIG. 2, the gas operated shock absorbers 16 extend from their retracted positions, shown in the solid-line gas operated shock absorber 16a in FIG. 5, to the extended position, shown in the broken-line gas operated shock absorber 16b of FIG. 5. As the gas operated shock absorbers 16 are deployed, the top ends of the gas operated shock absorbers 16 rotate around the support fasteners 14, and the bottom ends of the gas operated shock absorbers 16 rotate around the shock absorber pivot pins 40. Since the extended gas operated shock absorbers 16 serve as hypotenuses of the right angle 32 formed between the tailgate 11 and the platform unit 12, the gas operated shock absorbers 16 maintain the platform unit 12 in the horizontal orientation.

To erect the fence units 22, the fence units 22 are simply rotated upward around the fence-to-platform hinges 30. When cargo (not shown) is placed on the non-skid top surface 20, the erected fence units 22 serve to prevent the cargo from falling off of the platform unit 12 during stop and go movements of the vehicle.

Cargo securement straps (not shown) can also be used to secure the cargo to the platform unit 12. In this respect, the cargo securement straps can be threaded through the fence slots 26 to lash the cargo onto the platform unit 12.

To remove cargo from the tailgate-attached cargo support apparatus 10 of the invention, the cargo securement straps are detached from the cargo and the fence slots 26. Then, the cargo is lifted off of the platform unit 12.

After the cargo as been removed from the platform unit 12, and it is desirable to return the tailgate-attached cargo support apparatus 10 to the raised and storage position, the fence units 22 are rotated downward around the fence-to-platform hinges 30 so that the fence units 22 are parallel to the non-skid top surface 20 of the platform floor 18. Then, the platform unit 12 is rotated upward around the platform-to-tailgate attachment hinge 28 so that the platform unit 12 is in a vertical orientation and parallel to the tailgate 11. Then, a proper key is inserted into the platform-lock-key-reception slot 36 to operate the tailgate-latch-handle-engaging platform lock bolt 34 to engage with the tailgate latch handle 13. In this way, the tailgate-attached cargo support apparatus 10 is locked onto the tailgate 11 until needed another time.

With the tailgate-attached cargo support apparatus 10 locked to the tailgate 11, when it is desired to lower the tailgate 11, a proper key is inserted into the tailgate-lock-key-reception slot 15, and the tailgate 11 can be lowered and then raised again in a conventional manner. When the tailgate-attached cargo support apparatus 10 is locked to the tailgate 11, both the tailgate 11 and the tailgate-attached cargo support apparatus 10 are lowered and raised together without the platform unit 12 deploying horizontally as described above.

The reflective material 24 on the rear-facing end of the platform unit 12 serves as a safety device for drivers of vehicles that are behind the vehicle which is carrying the tailgate-attached cargo support apparatus 10 of the invention.

The tailgate-attached cargo support apparatus 10 of the invention can be used with any vehicle that has a tailgate, such as a pickup truck and a sports utility vehicle (SUV). Also, the tailgate-attached cargo support apparatus 10 of the invention can be used when pulling a trailer.

The tailgate-attached cargo support apparatus 10 of the invention can be retrofitted onto a conventional tailgate 11. Also, the subject apparatus can be manufactured as a combination tailgate/tailgate-attached cargo support apparatus.

The tailgate-attached cargo support apparatus 10 can be painted the same color as the tailgate 11 so that the tailgate-attached cargo support apparatus 10 will be less distinguishable when not in use.

The components of the tailgate-attached cargo support apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tailgate-attached cargo support apparatus that is low in cost, relatively simple in design and operation, and which may advantageously be used to provide a tailgate unit that includes foldable fence units that can be folded into the tailgate unit for storage when the fence units are no longer needed. With the invention, a tailgate-attached cargo support apparatus is provided which permits the tailgate to remain in the raised condition when the tailgate extender is in use. With the invention, a tailgate-attached cargo support apparatus provides that the floor of a truck bed extender is coplanar with the truck bed. With the invention, a tailgate-attached cargo support apparatus is provided such that when the truck bed extender is stored in the tailgate unit, the truck bed extender is hidden from view and is integrated into the tailgate. With the invention, a tailgate-attached cargo support apparatus provides means for orienting a lowered tailgate unit in an orientation that is coplanar with the truck bed.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A cargo support apparatus attached to a tailgate, comprising:
a platform unit,
platform-to-tailgate attachment means, connected between said platform unit and the tailgate at the bottom of the tailgate, for attaching said platform unit to the tailgate,
platform-to-tailgate orientation and support means, connected between said platform unit and the tailgate, for orienting and supporting said platform unit with respect to the tailgate, and
platform-to-tailgate locking means, connected to said platform unit, for locking said platform unit in a raised condition with respect to the tailgate,
wherein:
the tailgate includes a tailgate latch handle, and
said platform-to-tailgate locking means include a platform-mounted, tailgate-latch-handle-engaging platform lock bolt which engages the tailgate latch handle.

2. The apparatus of claim 1 wherein said platform unit includes a platform floor which includes a non-skid top surface.

3. The apparatus of claim 2 wherein said platform unit includes a plurality of fence units attached to outside edge portions of said platform floor.

4. The apparatus of claim 3 wherein said fence units are hingedly attached to said platform floor by fence-to-platform hinges.

5. The apparatus of claim 3 wherein said fence units include fence slots.

6. The apparatus of claim 1 wherein said platform unit includes reflective material on a rear-facing end of said platform unit when said platform unit is in a horizontal orientation when deployed for carrying cargo.

7. The apparatus of claim 1 wherein said platform-to-tailgate attachment means include a platform-to-tailgate attachment hinge connected between one side of said platform unit and the bottom of the tailgate.

8. The apparatus of claim 1 wherein said platform-to-tailgate orientation and support means include horizontal-orientation-support means for orienting said platform unit in a horizontal orientation with respect to the tailgate.

9. The apparatus of claim 8 wherein said horizontal-orientation-support means include:
support fasteners connected to the tailgate, and
telescopic orientation and support means rotatably connected at a top end to said support fasteners and rotatably connected at a bottom end to a distal portion of said platform unit.

10. The apparatus of claim 9 wherein said telescopic orientation and support means have a linear extension which is approximately equal to the hypotenuse of a right triangle formed by a side of the tailgate, a side of said platform unit, and said linear extension of said telescopic orientation and support means forming the third side, wherein an approximately right angle is formed between the side of the tailgate and the side of the platform unit.

11. The apparatus of claim 9 wherein said telescopic orientation and support means include:
gas operated shock absorbers rotatably connected at a top end to said support fasteners and rotatably connected at a bottom end to a distal portion of said platform unit.

* * * * *